July 22, 1969
C. J. MUTTER
3,456,855
SCORING AND SEPARATING A CONTINUOUS LENGTH OF MATERIAL
Filed March 29, 1967
5 Sheets-Sheet 1
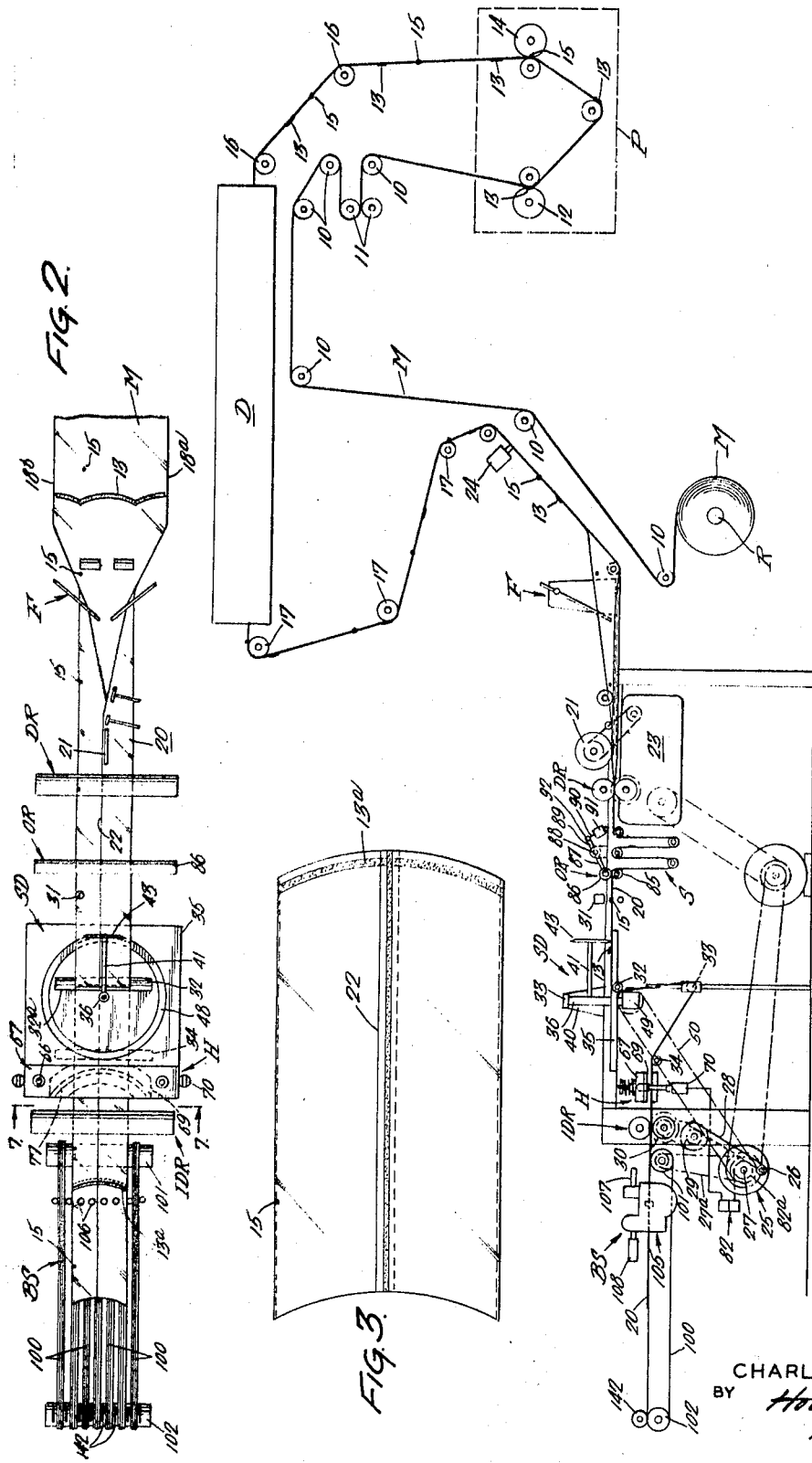
INVENTOR:
CHARLES J. MUTTER
BY Howson & Howson
ATTYS.

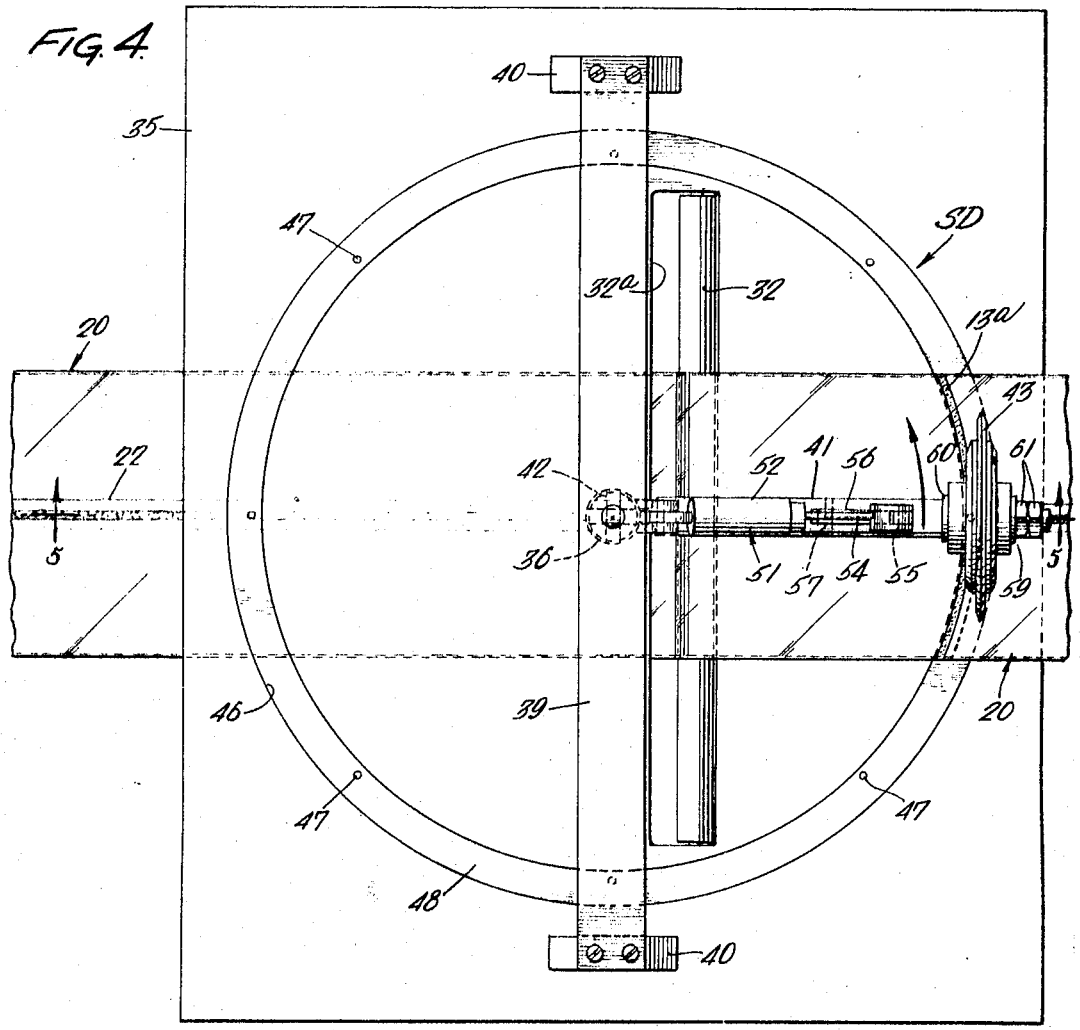
FIG. 4.
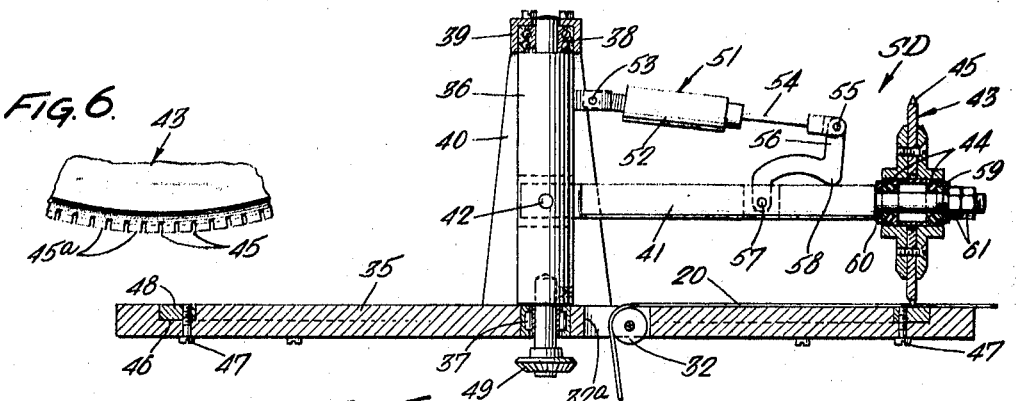
FIG. 6.
FIG. 5.
INVENTOR:
CHARLES J. MUTTER
BY
Howson & Howson
ATTYS.

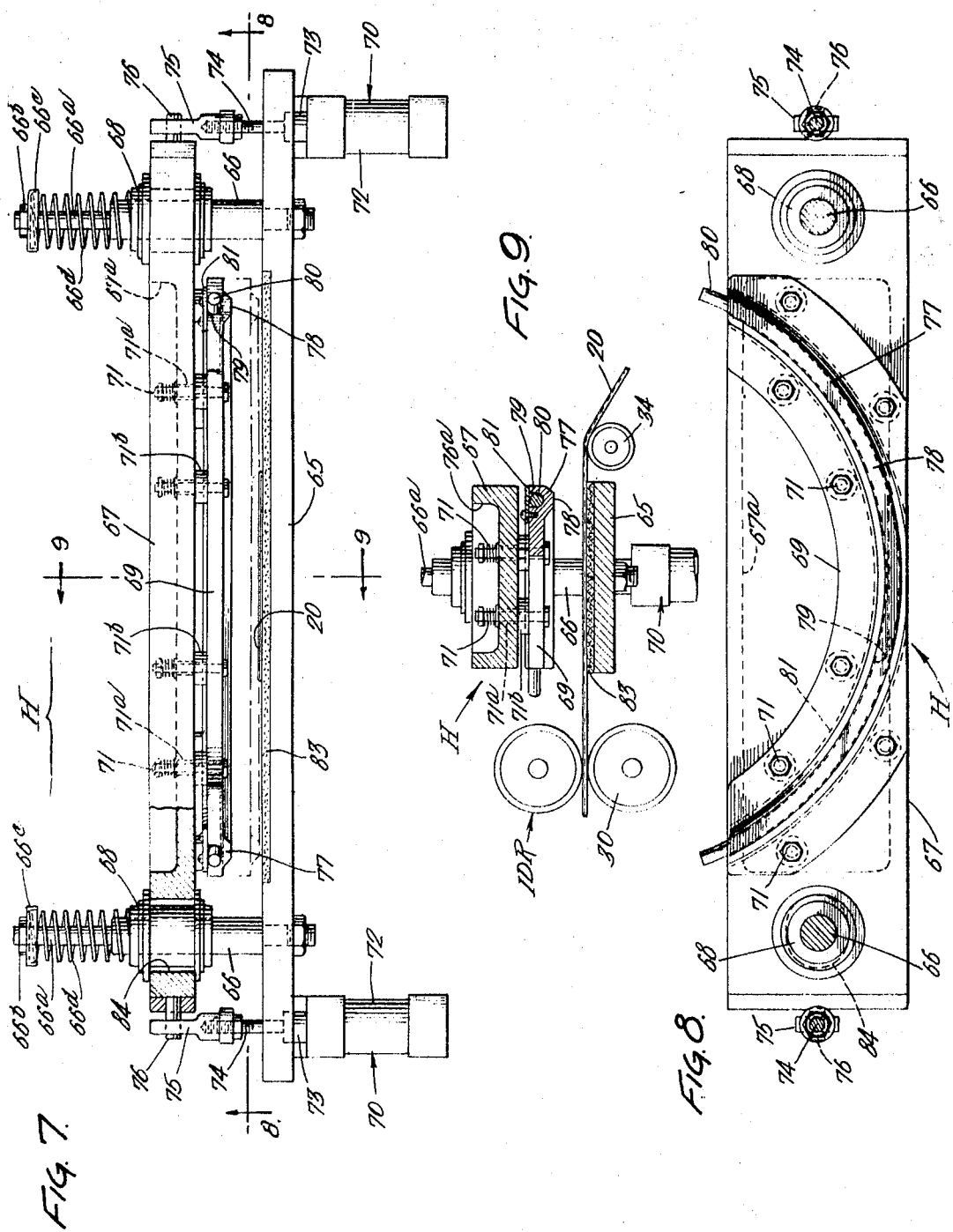

INVENTOR:
CHARLES J. MUTTER
BY Howson & Howson
ATTYS.

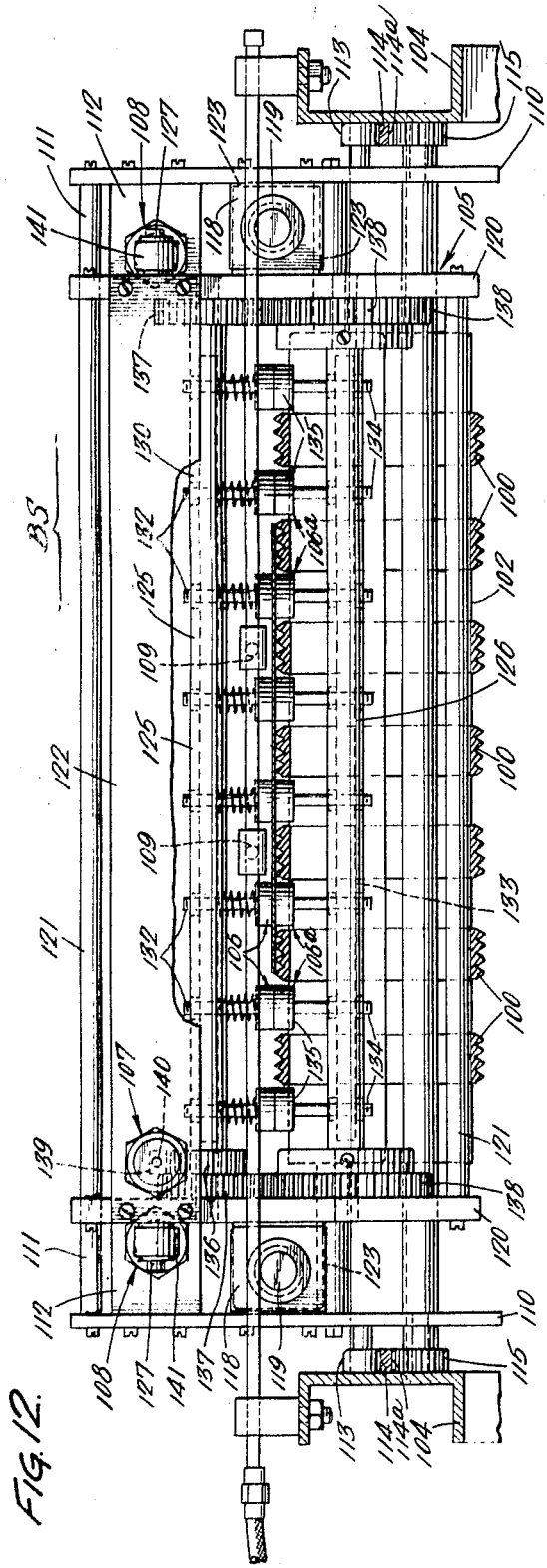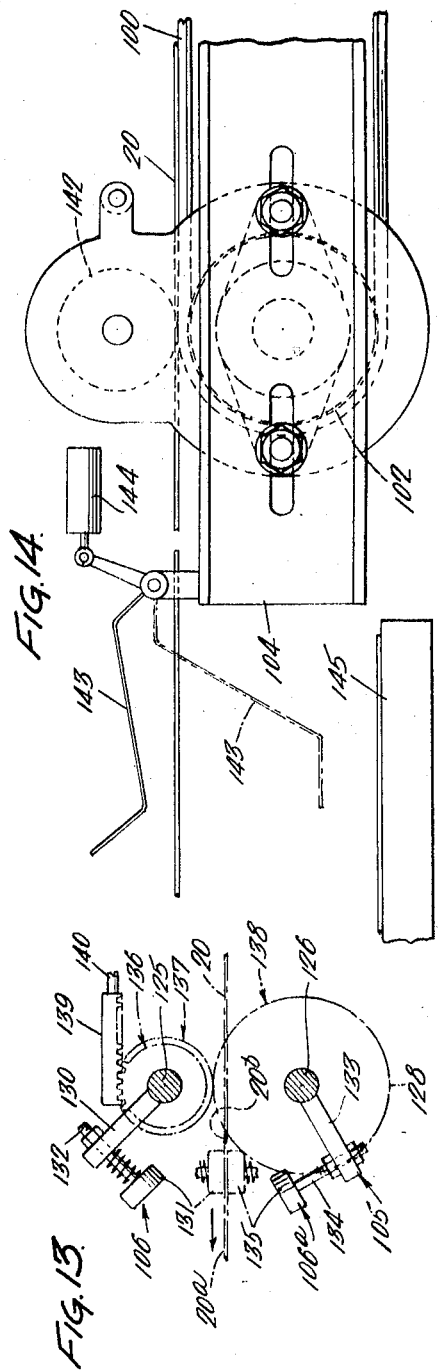

United States Patent Office 3,456,855
Patented July 22, 1969

3,456,855
SCORING AND SEPARATING A CONTINUOUS LENGTH OF MATERIAL
Charles J. Mutter, Barto, Pa., assignor to Boyertown Packaging Service Corp., Boyertown, Pa., a corporation of Pennsylvania
Filed Mar. 29, 1967, Ser. No. 626,799
Int. Cl. B26f 3/02; B26d 5/20
U.S. Cl. 225—96    14 Claims

ABSTRACT OF THE DISCLOSURE

A machine for the continuous production of bags of polyester material having a rotary serrating mechanism for arcuately serrating, at spaced intervals, a web of polyester material passing under the serrating mechanism. A heat sealer for sealing the bottom of the bags being produced is positioned adjacent the serrating mechanism, and means are provided for relieving the web of tension in the region of the serrating mechanism and the heat sealer. Subsequent to the sealing of individual bags, bag separating or severing mechanism with nonfriction grippers sever finished bags from the tubular web.

SUMMARY OF THE INVENTION

The present invention relates to apparatus for manufacturing bags from a continuous flat web of material, particularly bags composed of polyester materials such as Mylar having rounded-closed bottoms and rounded-open ends.

More specifically, the present invention relates to a bag-making machine including apparatus adapted to continuously feed a flat web of material from a reel to a printing unit for printing glue patterns of scalloped contour and ink eye spots on the web in predetermined spaced relation, to fold the web of flat material into a tubular web, to then intermittently feed the tubular web to a serrating mechanism for providing transverse arcuate serrations in the web at spaced intervals corresponding to the spacing of the glue patterns and ink eye spots, to then transversely heat seal the web at the advanced glue patterns previously made to provide a sealed bottom for the bags being produced, to then separate or sever finished bags from the tubular web and to discharge the finished bags to a stacking table.

BACKGROUND

In the packaging of poultry or like articles, it is preferred to provide a polyester shrink package, for example an uncoated 65 gauge HS Mylar that is oriented molecularly for heat shrinkage, so that upon evacuation of the package of air entrained therein, and subsequent heat treatment, the package will conform to the contour of the article being wrapped. In most instances with, for example, food stuffs such as poultry, it is desirable to provide a bag having an arcuate bottom edge so that upon shrinking the bag over the product unsightly ears do not project therefrom and the bag more generally conforms to the exterior contour of the product.

DESCRIPTION OF THE INVENTION

In view of the above, an important object of the invention resides in the provision of a rotary serrating mechanism adapted to arcuately serrate a web of tubular material at spaced intervals.

Another object of the present invention resides in the provision, in a rotary serrating device of the character described, of means for compensating for wear of the serrating anvil of the device.

Another object of the invention resides in the provision of means for relieving tension in the web of tubular material in the regions of the serrating mechanism.

A further object of the invention resides in the provision of a transverse heat sealer adapted to tightly seal the tubular web of material at previously applied glue patterns to provide sealed bottoms for the finished bags.

Another object of the present invention is the provision of a transverse heat sealer of the character described in which provision is made to take care of expansion and contraction of the heat sealer parts to thereby permit full sealing of each bag bottom.

Still another object of the present invention is to provide bag separating or severing mechanism adapted to separate the bags in an effective manner without leaving objectionable and unsightly marks on the separate bags such as transverse friction marks.

Another object of the present invention is to provide mechanism in which the bags are separated or severed from the tubular web of material without static buildup.

A further object of the present invention resides in the provision of a discharge conveyor for the completed bags in which the completed bags are held in place on the conveyor wholly by air pressure.

Other objects and a fuller understanding of the invention may be had by referring to the following specification and claims taken in conjunction with the accompanying drawings in which:

FIGS. 1 is a schematic side elevational view of a bag-making machine constructed in accordance with the invention;

FIG. 2 is a plan view of a portion of the apparatus illustrated in FIG. 1 with certain apparatus removed for clarity;

FIG. 3 is a view of a finished bag produced by the machine shown in FIGS. 1 and 2;

FIG. 4 is an enlarged fragmentary plan view of a serrating device employed in the machine;

FIG. 5 is a fragmentary sectional view taken along line 5—5 of FIG. 4;

FIG. 6 is an enlarged fragmentary view of a portion of the serrating wheel shown in FIGS. 4 and 5;

FIG. 7 is an enlarged fragmentary sectional view taken along line 7—7 of FIG. 2 and illustrating the heat sealing device of the machine;

FIG. 8 is a sectional view taken along line 8—8 of FIG. 7;

FIG. 9 is a sectional view taken on line 9—9 of FIG. 7;

FIG. 12 is a sectional view taken along line 12—12 of FIG. 11;

FIG. 13 is a detail view showing a portion of the apparatus (bag grippers) of FIGS. 11 and 12 in another position; and FIG. 14 is an enlarged fragmentary elevational view of the left hand (bag discharge) end of the machine as viewed in FIGS. 1 and 2.

Figure 10:
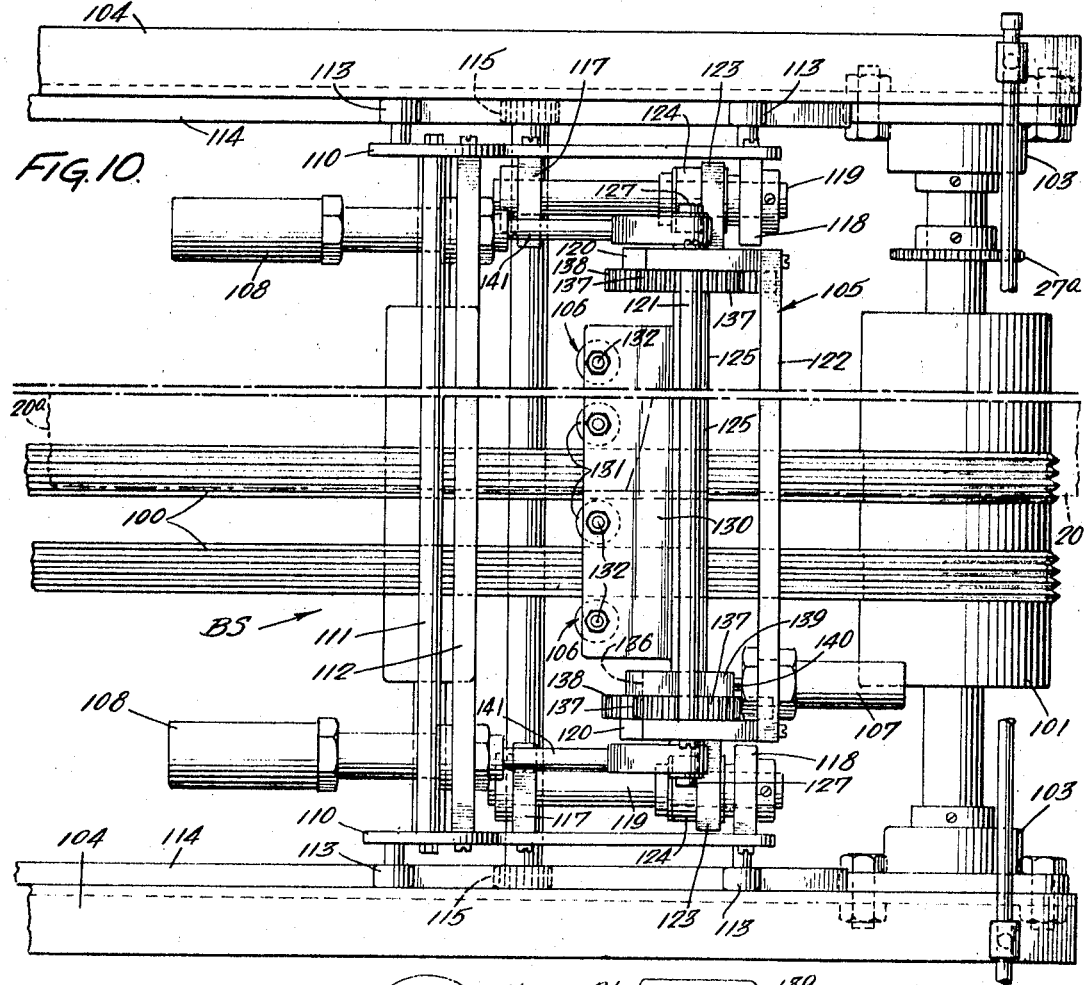
FIG. 10 is a fragmentary plan view of a bag separating device located at the bag discharge end of the machine.

Referring now to the drawings and particularly FIGS. 1 and 2 thereof, an improved bag-making machine comprising a series of coordinated units is illustrated therein. As shown, a supply reel R carries a roll of heat shrinkable polyester material M, such as Mylar which is fed into an applicator, in the present instance a printing mechanism P. The material M is then fed into a dryer D, and thereafter into a folding mechanism F where the opposite longitudinal edges of the material are folded to the longitudinal centerline in overlapping relation. As shown, continuously driven draw roll DR feed the web of material from the supply reel through the printing mechanism P, the dryer D and the folding mechanism F. As best shown in FIGS. 1 and 2, intermittently driven draw rolls 1DR intermittently feed the material through a slack take-up device S, overspeed draw rolls OR, a serrating device SD, and a transverse heat sealer H. Thereafter the heat sealed and serrated tubular web is fed into a bag separating and delievery unit BS.

The flat web of material M is led from the supply reel R over suitable guide rolls 10 and between a pair of driven nip rolls 11, to a rotary printing roll 12 for printing transverse glue patterns 13 (see FIG. 2) of scalloped contour onto the web, then to a rotary printing roll 14 for printing an ink dot 15 on the web and next over suitable guide rolls 16 to and through the dryer D.

The circumferences of the printing rolls 12 and 14 are equal to the length of the bag being produced so that with each revolution of the print rolls glue patterns 13 and dot imprints 15 are made on the web of material M. in proper spaced relation.

From the dryer D the web is led around suitable guide rolls 17, and a softening solvent, such as benzyl alcohol, is applied along one edge 18a of the web by means of an applicator 24. Thereafter, the flat web M is introduced into the folding mechanism F, of known form, which folds the longitudinally extending side edges 18a and 18b of the web to form a tubular web 20. As shown in FIG. 2 the edge 18a to which the solvent has been applied, is positioned in superimposed overlapping relation with respect to the edge 18b. A heat seal roll 21 is provided to heat seal the overlapping edges of the folded web to provide a closed longitudinal seam 22. The heat seal roll is driven from an output shaft of a standard drive unit 23 of well know form.

The longitudinally sealed tubular web 20 is then fed in continuous feed by the draw rolls DR to the weighted slack takeup device S, the draw rolls being continuously driven from an output shaft of the unit 23.

For reasons which will become more evident hereinafter, the tubular web is intermittently fed along by means of the intermittently driven draw rolls 1DR and proceeds from the slack takeup device S to the discharge end of the machine. The intermittent drive 25 for the rolls 1DR is well known and may be of the type generaly exemplified in the Schjeldahl et al. Patent No. 2,997,889 and therefore forms no part of the present invention. However, for clarity, the device generally includes an adjustable crank 26 secured on a continuously driven 1:1 ratio shaft 27 and a reciprocating rack 28 for rotating a pinion 29 on its up stroke and free-wheeling the pinion on its down stroke. The pinion 29 is drivingly connected to the lower draw roll 30 of the draw rolls 1DR, and an electric clutch and brake (not shown) are associated with the shaft of the roll 30 for clutching the roll 30 in and out of engagement with the pinion and braking the rotation of the roll 30 as desired.

In order to selectively control the clutching and braking action the electric clutch and brake are activated by an electric eye unit 31 cooperating with the ink dots 15 of the tubular web 20 and by cam switches, which is a known manner permit the intermittent advance of the tubular web a distance equal to the spacing of the ink dots 15.

In order that bags may be formed from the tubular web 20 and properly sealed along the scallop glue line 13, the serrating device SD and the transverse heat sealer H are located intermediate the slack take-up device S and the intermittent draw rolls 1DR. In accordane with one feature of the invention, the serrating device SD operates upon the web 20, during periods of pause when the draw rolls 1DR are inactive, to arcuately serrate the web for subsequent formation of individual bags. To this end, and referring particularly to FIGS. 4-6, the serrating device SD comprises a base plate 35 fixedly supported on the framework of the machine, and includes an upright post 36 mounted for rotation at its lower end in a bearing 37 carried by the base plate and at its upper end in a bearing 38 carried by a cross bar 39. As shown, the cross bar 39 is supported from the base plate by brackets 40. As shown, a radially projecting arm 41 is pivotally mounted on the post 36 by a pivot pin 42 which carries, at its outer end, web serrating means, in the present instance including a rotatable serrating wheel 43. As best shown in FIG. 5, the wheel 43 is mounted for free rotation on the radial arm 41 by means of bearings 44, and is provided with a plurality of circumferentially spaced notches 45 and intermediate sharp serrating edges 45a at its periphery as shown in FIG. 6.

As the arm 41 rotates about the post 36, the serrating wheel 43, which is under pressure, bears against the web 20 and thus the base plate 35. In order to take the wear, secured in a circular groove 46 in the base plate 35 by means of screws 47 is a ring or circular anvil 48 of hardened steel on which the serrating wheel tracks upon rotation of the post 36 and radial arm 41.

The post 36, radial arm 41 and wheel 43 are bodily rotated in a counterclockwise direction (FIG. 4) by means of right angle gearing, such as miter gearing 49, driven from the continuously rotating shaft 27 as by a chain drive 50 (FIG. 1). Thus the rotation of the post and arm is, in the present instance, constant and the rotation of the post 36 is timed so that the tubular web 20 is at rest on the table or base plate 35 when the serrating wheel 43 sweeps over it to pierce it with arcuate serrations or perforations. It should be noted that the arcuate or scalloped glue pattern 13, when folded forms an arcuate glue line 13a positioned a short distance, in the direction of web travel, past the point at which the arcuate serrations are made. In this manner, when the transverse heat sealer H seals the bottom of a bag, an arcuately shaped open top is provided for the next bag to be sealed.

In order to maintain adequate pressure contact of the wheel 43 on the tubular web so that clean sharp serrations are produced, wheel pressurizing means 51 are provided on the arm 41. To this end, the wheel pressurizing means 51 comprises a piston and cylinder device 52 preferably of the air actuated variety, which exerts downward pressure on the arm 41 and thus, the wheel 43. As shown in FIGS. 4 and 5, the cylinder 52 is pivotally attached to the post 36 by a yoke and pin arrangement 53, and the piston rod 54, of the cylinder 52, is pivotally connected as at 55 to a rock arm 56 pivoted at 57 in the radial arm 41 and having a heel 58 bearing against the arm 41.

An important feature of the serrating device is through the provision of sharp edges 45a, the serrations for bag separation are clean which permits the finished bags to be not only easily separated from the web, but easily opened for the insertion of a product. The easy opening of the bag is due to the absence of any peening action in making the serrations which would cause the openable end of the bag to stick shut.

Even with a hardened steel ring anvil 48 for the wheel 43, after continued use a groove may be worn in the surface of the ring or anvil 48 by the wheel 43. When this occurs, adjustment means are provided for shifting the wheel radially of the post 36 so that the sharp edges 45a overlie a new portion of the ring 48. To this end, the wheel is capable of axial adjustment relative to the arm 41 by means of insertion or deletion of additional spacers or washers such as the spacers or washers 59 and 60 provided at each side of the wheel. As shown, the wheel is held in place by a pair of nuts 61 and it should be noted that in making wheel adjustments or in replacement of a wheel, or if sharpening of the wheel becomes necessary, these can readily be accomplished by the simple removal of the nuts 61.

An additional wear adjustment is also incorporated in that the holes for the screws 47 are threaded all the way through the ring 48 so that the ring may be turned over to expose a new, unscored bottom surface thereof to the wheel when the top surface has become objectionably scored. In this connection it is noted that excessive scoring of the ring causes the serrations to become ragged with the result that clean tear-off of the completed bags may not be accomplished.

After the tubular web is serrated, the web 20 is advanced, as heretofore described, until the glue line 13a registers with the heat sealer H. To this end and located adjacent the delivery end of the serrating table 35 is an intermittently operable transverse heat sealer H by means of which the glue line 13a, previously applied by the printing roll 12, is heat sealed to form a tightly sealed bottom for the bag. The tubular web is lead from the serrating device SD to the heat sealer H by passing downwardly over a roll 32 located in a transverse slot 32a in the base plate 35, then around a vertically adjustable roll 33 (see FIG. 1) and upwardly over a roll 34 located adjacent the sealer H.

Referring particularly to FIGS. 7–9 the heat sealer H comprises a transverse base plate 65 fixedly secured to the framework of the machine and to which is connected a pair of laterally spaced upright posts 66 adjacent the ends of the base plate 65. A cross head or holder member 67 is mounted for vertical reciprocation on the posts 66 by bushings 68, and carried by the holder member 67 is an arcuate heat sealing shoe 69. Outboard of the holder member are shoe actuating devices 70, connected to the holder which impart vertical reciprocating movement to the holder member and thus the sealing shoe 69.

The sealing shoe 69 is mounted against the bottom face of the holder member 67 by means of spring-loaded bolts 71 which pass upwardly through clearance holes 71a in the holder. Heat insulating washers 71b are positioned on the bolts intermediate the shoe and holder. By this flexible mounting of the shoe, yield, due to expansion and contraction as between the shoe and holder is provided. The holder member 67 is provided with a cavity 67a in its upper surface to facilitate cooling of the holder.

Each shoe actuating device 70 includes a cylinder 72 secured to the base plate 65 and a piston 73 having an upwardly extending piston rod 74 provided with an adjustable head fitting 75 bored to fit laterally extending pins 76 at the ends of the holder member 67.

The bottom face of the shoe 69 is provided with a depending rib 77 arcuately contoured to correspond to the arcuate contour of the glue line 13a and having a flat sealing surface or land area 78. The shoe is also provided with a recess 79 for a heating element 80 held in place by a retainer plate 81.

The up and down movement of the shoe 69, or the reciprocation of the pistons 73 is controlled by a valve and switch 82 (FIG. 1) actuated by a cam 82a on the shaft 27 and timed to move the sealing shoe down into sealing contact with the tubular web 20 during the interval of nonmovement of the web, i.e., when the clutch of the intermittent unit 25 is released and the brake applied. The cam is configured to give a pressure sealing dwell to the heat sealing shoe of approximately 42% of a cycle to insure a tight bottom seal. In order to provide for overall contact of the shoe with the tubular web in the event of warping of the shoe due to heat, a cushioning pad 83, preferably composed of silicon material, is provided on the base plate 65.

In order to provide for freedom of expansion and contraction of the holder member 67 on the posts 66, it will be seen from FIGS. 7 and 8 that the aperture 84 for the bushing 68 of the left hand post is elongated. It will also be seen that the posts are provided with top extension rods 66a having nuts 66b and cupped washers 66c for retaining the springs 66d which bear down on the bushing 68 so as to cushion and damp the upward movement of the holder member 67.

It is important to note that the tubular web 20, when intermediate the slack takeup device S and the intermittent draw rolls 1DR, should be relatively free of high tension to prevent inadvertent and untimely separation of serrated portions of the web when the intermittent draw rolls 1DR start a cycle. To this end, and as best shown in FIG. 1, the overspeed draw device OR, located adjacent to the slack takeup device S, preferably drives the web towards the serrating device SD at a greater speed than the intermittent draw rolls 1DR. The lower roll 85 of overspeed draw device OR is suitably driven from the intermittent draw roll 30 and the upper retractable nip roll 86, of larger diameter than the roll 85, is mounted for free or idler rotation on a lever 87 pivotally mounted in a fixed bracket 88 by a pin 89. Roll pressurizing means operate to cause engagement of the nip roll 86 against the web 20, the means comprising in the present instance an air piston and cylinder device 91, the piston rod 90 of which is connected to the lever 87 at 92. The piston and cylinder device 91 is actuated by a 1:1 cam having a short cam lobe which causes a short intermittent pressure at the nip of the upper roll 86 on the tubular web. During this pressure at the nip the web is drawn from the slack take-up device S and is advanced at a speed greater than the speed of advance given to the web by the intermittent draw rolls 1DR thus causing slack to develop in the run of web between the device OR and the draw rolls 1DR and thereby relieving this run of web of high tension. The overspeed of the draw roll 30 relative to the intermittent draw rolls 1DR, when the draw rolls 1DR are in operation, is preferably approximately 3%.

The timing of the pressure nip of the roll 86 is such that web slack or tension relief is effected during the time that the serrating wheel 43 is serrating the web thus preventing tear off of the web at the serration due to web tension. Thus in the absence of the above tension relief the suddenness of the pull of the intermittent draw rolls 1DR when starting a cycle would cause untimely and objectionable tearing off the web at the serrations.

Figure 11:
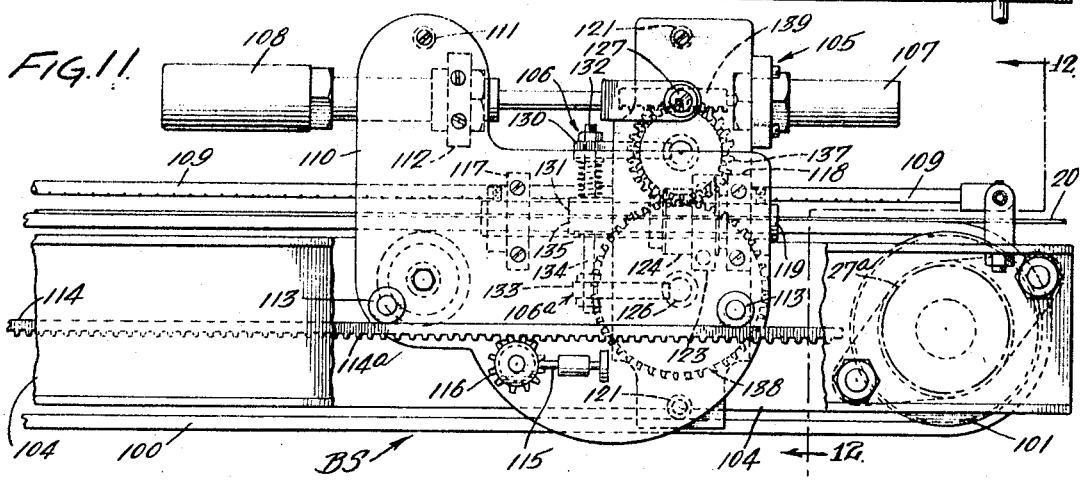
FIG. 11 is a side elevational view of FIG. 10.

After the tubular web 20 has been serrated and the heat sealer device H has effected a bond between the superimposed portions adjacent the serration, the web is separated along the serrations to form individual bags. To this end and referring more particularly to FIGS. 10–14, the bag separating or severing unit BS shown therein comprises in general a plurality of laterally spaced endless corrugated conveyor belts 100 which travel around laterally extending end rollers 101 and 102 (see FIG. 1) mounted in bearings 103 secured to side frame members 104. The conveyor belts 100 are continuously driven from the 1:1 shaft 27 (FIG. 1) at a speed of travel somewhat greater than the speed of travel of the tubular web 20 by suitable chain and sprocket connections 27a. A gripper assembly 105 operates in conjunction with the conveyor to separate bags from the web and includes a plurality of upper and aligned lower grippers 106 and 106a respectively. As shown in FIG. 12, the grippers are interdigitated with individual runs of the belts 100 and positioned so as to engage opposite sides of the web 20. Gripper actuating means include a piston and cylinder device 107 for opening and closing the grippers and a pair of piston and cylinder devices 108, for imparting back and forth movement to the gripper assemblies. For purposes which will become more evident hereinafter, overhead air blow pipes 109 are positioned to overlie the conveyor belts.

Referring now more specifically to the severing unit BS, a frame structure having laterally spaced side plates 110 and including transverse tie bars 111 and 112 is movable longitudinally by wheels 113 riding on longitudinal tracks 114 having a rack 114a on the lower side thereof and fixed to the main side frame members 104. The frame structure carries the various operating parts of the unit BS and is adapted to be rolled along the tracks 114 to desired positions to suit the length of bags being produced and then locked in place by a lock 115 (FIG. 11), carried by the side plates 110 and engageable with a pinion 116 meshing with the rack 114a.

In order to effect longitudinal movement of the gripper assembly longitudinally spaced brackets 117 and 118 are secured to each side plate 110, and support a slide rod 119 on which the gripper assembly 105 is adapted to slide back and forth. As best shown in FIGS. 10–14, the gripper assembly 105 comprises a pair of laterally spaced side plates 120, connected by cross tie bars 121 and 122, and including laterally projecting brackets 123, secured to the side plates 120. Slide bushings 124 carried by the brackets 123 and sliding on the slide rods 119 permit longitudinal movement of the gripper assembly 105. In order to cause movement of the assembly 105, actuating means are provided comprising an upper rock shaft 125 trunnioned in the side plates 120, a lower rock shaft 126 similarly trunnioned in the side plates and extending laterally and parallel to the rock shaft 125, and a piston and cylinder device 107 mounted adjacent one end of the tie bar 122. In addition, a pair of piston and cylinder devices 108, having piston rods 141, are secured outboard of the side plates 120, by laterally extending pins 127.

As shown in the drawings, the upper rock shaft 125 has connected thereto an axially extending plate 130 projecting therefrom for mounting the dependent spring-loaded grippers 106, the grippers 106 having rubber gripper cups 131 carried by depending stems 132. In a like manner, the lower rock shaft 126 has a similar plate 133 which mounts the upstanding grippers 106a by means of upright stems 134 which carry rubber gripper cups 135.

In order to effect the opening and closing of the grippers 106 and 106a by the piston and cylinder device 107, secured on the upper rock shaft is a gear 136 and outboard thereof laterally spaced gears 137. The gears 137, mesh with gears 138, secured on the lower rock shaft while the gear 136 meshes with a rack 139 secured to the piston rod 140 of the piston and cylinder device 107. It will thus be seen that when the rack 139 is actuated by cylinder 107 the rock shafts 125 and 126 are oscillated to open and close the grippers 106 and 106a.

In order to effect longitudinal movement of the grippers by the piston and cylinder devices 108, the piston rods 141 thereof are connected to the gripper assembly 105 by means of the connecting pins 127 above referred to and therefore when the piston and cylinder devices 108 are actuated the gripper assembly 105 is moved back and forth on the tracks 114 above-described.

In operation, when the gripper assembly 105 is in its right hand position as shown in FIGS. 1, 2, 10, and 11 the grippers close to grip the leading bag 20a of the web 20 at a point adjacent the sealed bottom 20b of the bag. It is pointed out that actuation of the cylinder devices 108 to move the gripper assembly 105 to this right hand position and actuation of the cylinder device 107 to close the grippers is timed in a known manner by switches tied into the circuit of other switches that control the heat sealer H so that the bag separating unit BS cycles in synchronism with the heat sealer H cycle. After gripping the leading bag, the piston rods 141 and connected gripper assembly, with the grippers still gripping the bag, moves to the left to tear this bag loose from the tubular web 20. It is noted that as the grippers move to the left, the draw rolls 1DR are at rest and act as a holder for the web 20. After tearing, the grippers open and the gripper assembly moves back in position ready for the grippers to grip the next bag.

A feature that is of particular importance in connection with the above-described bag separation mechanism is its ability, due to the employment of the novel grippers, to gently separate or sever the bags without leaving objectionable friction marks on the bags such as are inherent in devices employing friction rolls for bag separation. Also through the use of the friction grippers described the bags are separated or severed at the arcuate serrations by what may be termed a "zip action" rather than a straight across pull. It has also been found that through the practice of this method of bag separation in lieu of the normal friction roll method, accumulation of objectionable static buildup is avoided.

After the bags are separated from the web, the conveyor moves the bags to a stacking means. However, it is necessary, in view of the lightness of the material to hold the bags on the conveyor. To this end, overhead air blow pipes 109 blow air down onto the bags on the corrugated conveyor belts 100 to effectively hold the bags in place on the conveyor without the use of mechanical hold-down means.

In order to prevent floating of the bags as they leave the conveyor belts 100, the bags pass under narrow rolls 142 located intermediate the belts, as shown in FIG. 2, and adapted to temporarily corrugate the bags to give them firmness upon discharge.

In order to insure that the bags are deposited on, for example, a stacking table, such as the table 145 (FIG. 14), a pivoted spring plate 143 actuated by timed cylinder 144 strikes the trailing end portions of the bags being discharged from the conveyor to deposit them on the stacking table 145.

It will be apparent to those skilled in the art that the machine is capable of producing bags of different widths within the limits of the slot 32a in the base plate 35 of the serrating device SD and of varying lengths in accordance with the spacing of the glue patterns 13 and ink dots 15.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:

1. A machine for separating a continuous length of material in the form of a flattened tubular web of material along arcuate lines including a rotary scoring mechanism for arcuately scoring said tubular web along said lines, including a fixed circular anvil, a rotatable scoring wheel mounted for bodily rotation about the vertical axis coincident with the center of said circular anvil whereby the wheel tracks circularly on one planar surface of said anvil, means for exerting pressure on said wheel to urge it against said anvil surface as it tracks thereon, means to guide the flattened web across a segment of said anvil surface, means to position said web so that each of said arcuate lines is in registry with said anvil segment whereby said web is scored by said wheel along said line, means providing a passage for said web through said circular anvil intermediate said segment and said vertical axis whereby said web is guided out of the plane of said anvil, and mechanism to grip and pull said web to separate the same along said lines.

2. Apparatus according to claim 1 wherein said means to position said web comprises means to advance said web across said segment intermittently, said web being arrested when said arcuate line is in registry with said anvil segment, and including means to rotate said wheel on its vertical axis continuously, and driving connections between said intermittent web-advancing means and said continuous wheel-rotating means to arrest said web during travel of said wheel over said segment and advance said web during travel of said wheel over the remaining portion of said anvil.

3. Apparatus according to claim 2 wherein said means to advance said web comprises a pair of draw rolls engaging said web following its travel over said segment and through said passage means, and a draw device in advance of said segment, said driving connections including means to drive said draw rolls and draw device intermittently in timed relation to said scoring wheel.

4. Apparatus in accordance with claim 1 including a base plate having a circular groove therein, said circular anvil being annular in form and mounted in said groove, said passage means comprising a slotted opening in said plate intermediate said segment and its center, and a guide roller in said opening to guide said web therethrough.

5. Apparatus in accordance with claim 1 wherein said scoring wheel includes a plurality of circumferentially spaced notches and intermediate sharp serrating edges whereby said wheel produces an arcuate line of perforations in which peening shut of the tubular web is prevented as said wheel moves over the web on said anvil.

6. Apparatus in accordance with claim 4 including a rotatable upright post having a bearing at one end in said base plate and a bearing at the other end spaced upwardly therefrom, a radially projecting arm pivotally mounted on said post intermediate said bearings, means mounting said rotatable scoring wheel for rotation on said arm, and pressure means for exerting downward pressure on said wheel whereby an effective score is produced in the tubular web of material.

7. Apparatus in accordance with claim 6 including means for adjusting said wheel axially of said radially projecting arm.

8. A construction in accordance with claim 3 in which said gripping and pulling mechanism comprises a plurality of laterally spaced, longitudinally extending, conveyor belts beyond said pair of draw rolls; lateraly spaced gripper member pairs interdigitated with said spaced belts, one of said members of a pair positioned on one side of the plane of travel of said web, and the other of said members on the opposite side of the plane of travel of said web and aligned so as to clamp said web therebetween when closed, means for mounting said gripper members to open and close, means for actuating said gripper members closed to grip the tubular web of material, and means for moving said gripper members longitudinally of said conveyor to pull said web away from said pair of draw rolls when they are arrested and to effect separation of said tubular web of material along said arcuate score line positioned between said gripper members and said draw rolls.

9. Apparatus in accordance with claim 8 wherein said mounting means for said gripper members includes means connecting said gripper members for arcuate movement towards and away from one another respectively before and after separation of said web.

10. Mechanism for separating lengths of tubular material from a tubular web having a laterally extending, longitudinally spaced weakened score line therein; said mechanism including a series of laterally spaced gripper pairs adapted to positively grip the web of tubular material on opposite sides thereof and adjacent to the score line therein, means to hold said web at a point longitudinally spaced from the serrations adjacent to said grippers, means to advance the grippers away from said means to hold said web to thereby separate lengths of tubular material from said web and a series of laterally spaced conveyor belts interdigitated with said gripper pairs and extending from said holding means to and beyond said gripper pairs to support and convey the separated lengths of tubular material.

11. Mechanism for providing arcuate score lines at spaced intervals along a tubular web of material including means to feed the web intermittently into said mechanism; said mechanism comprising a base plate having a circular planar anvil surface therein, a rotatable scoring wheel mounted for bodily rotation about a vertical axis coincident with the center of said circular anvil, means to continuously rotate said wheel on said axis whereby said wheel tracks circularly on said anvil, means to guide the web to overlie a segment of said anvil surface intermediate said wheel and said anvil, and means for exerting pressure on said wheel whereby said wheel provides said arcuate score line when it tracks on said segment, driving connections between said intermittent web-feeding means and said continuous wheel-rotating means to rotate said wheel in timed relation to said feed means to track on said segment when said feed is inactive and to track on the remaining portion of said anvil surface when said feed is active.

12. Apparatus in accordance with claim 11 wherein said wheel includes a plurality of circumferentially spaced notches and intermediate interdigitated sharp serrating edges whereby peening shut of the tubular web is prevented as said wheel moves over said anvil segment.

13. Apparatus in accordance with claim 11 including a rotatable upright post concentrically mounted with the axis of said anvil, a radially projecting arm and means pivotally mounting said arm on said post for movement of said arm in a plane parallel to the axis of said upright post, said rotatable serrating wheel being mounted on said arm, said means for exerting pressure on said wheel including fluid pressure means connected to said arm and said post.

14. Apparatus in accordance with claim 13 including means for adjusting said wheel axially of said radially projecting arm.

References Cited
UNITED STATES PATENTS

| | | | |
|---|---|---|---|
| 1,906,813 | 5/1933 | Royal | 93—33 X |
| 2,004,129 | 6/1935 | Potdevin | 93—84 |
| 2,163,278 | 6/1939 | Hayes | 93—27 |
| 2,191,497 | 2/1940 | Potdevin | 225—96 |
| 2,705,443 | 4/1955 | Colby | 93—33 |
| 3,146,147 | 8/1964 | Naser | 83—678 X |
| 3,152,501 | 10/1964 | Nassar | 93—58 |
| 3,286,573 | 11/1966 | Esch | 83—12 X |
| 3,122,292 | 2/1964 | Ford | 225—100 X |

WAYNE A. MORSE, JR., Primary Examiner

U.S. Cl. X.R.

83—262, 470, 490, 678; 93—1, 33, 58.4; 225—100